| United States Patent [19] | [11] Patent Number: 4,728,505 |
| Era et al. | [45] Date of Patent: Mar. 1, 1988 |

[54] PROCESS FOR PRODUCING GALLIUM-CONTAINING SOLUTION FROM THE ALUMINUM SMELTING DUST

[75] Inventors: Akio Era; Shingo Matsui; Hidetsugu Ikeda, all of Fukuoka, Japan

[73] Assignee: Mitsui Aluminium Co., Ltd., Tokyo, Japan

[21] Appl. No.: 62,349

[22] Filed: Jun. 11, 1987

Related U.S. Application Data

[63] Continuation of Ser. No. 812,438, Dec. 23, 1985, abandoned.

[51] Int. Cl.$^4$ .............................................. C01G 15/00
[52] U.S. Cl. ................... 423/132; 75/101 R; 75/114; 75/115; 75/121
[58] Field of Search ............... 423/125, 126, 128, 132; 75/101 R, 114, 115, 103, 121, 25

[56] References Cited

U.S. PATENT DOCUMENTS

| 3,168,372 | 2/1965 | Nagumo et al. | 423/125 |
| 3,325,383 | 6/1967 | Iwanscheff et al. | 423/131 |
| 3,890,427 | 6/1975 | Dewey et al. | 423/131 |
| 4,094,753 | 6/1978 | Charlton et al. | 423/132 |
| 4,252,777 | 2/1981 | McDowell et al. | 423/128 |

FOREIGN PATENT DOCUMENTS 1527981 10/1978 United Kingdom .

*Primary Examiner*—Robert L. Stoll
*Attorney, Agent, or Firm*—Jordan and Hamburg

[57] ABSTRACT

Aluminum smelting dust is leached with mineral acids such as sulfuric acid, hydrochloric acid and nitric acid. Oxidizing agents such as potassium permanganate, manganese dioxide, hydrogen peroxide, ozone, potassium chromate, potassium dichromate, ammonium persulfate, sodium hypochlorite, sodium chlorite and sodium chlorate are added to the leach solution. The addition of an oxidizing agent remarkably improves the gallium extraction.

5 Claims, No Drawings

PROCESS FOR PRODUCING GALLIUM-CONTAINING SOLUTION FROM THE ALUMINUM SMELTING DUST

This application is a continuation of application Ser. No. 812,438, filed Dec. 23, 1985, now abandoned.

BACKGROUND OF THE INVENTION

The present invention relates to a process for producing gallium-containing solution having a high concentration of a gallium component from aluminum smelting dust.

Gallium is used as GaAs for high-speed semiconductors for satellite correspondence, IC for high-speed computers, GaAs or GaP for semiconductor lasers for optical communication and mass magnetic bubble domain memories using gallium gadolinium garnets.

Gallium is widely distributed all over the earth, but does not exist as highly concentrated ore. Therefore, gallium is presently obtained by the following processes (i) Gallium is recovered from Bayer liquor which is a highly concentrated alkaline solution dissolving Al(OH)$_3$. An electrochemical reduction process with a mercury cathode or a solvent extraction process is used for recovering gallium from the Bayer liquor. The solvent extraction process developed by Rhone-Poulenc Co. using KELEX 100 (trademark of alkylated-8-hydroxy-quinoline) is well-known (See pages 439-442, Vol. 2, 1979, Proceeding of the International Solvent Extraction Conference and French Patent No. 7629009).

(ii) Gallium is recovered from aluminum smelting dust by flotation (Japanese Patent Publication No. SHO59-111919, June 28, 1984) or alkaline roasting (See British Pat. No. 1527981).

(iii) Gallium is recovered from the residue of a zinc leach solution in a zinc smelting process, in which the residue is leached with sulfuric acid. And gallium is recovered by an extracting agent such as versatic acid or isopropyl ether (See pages 65-76, Proceeding of Fourth Joint Meeting MMIJ-AIME 1980. TOKYO).

Though gallium is recovered from residue of a zinc leach solution (iii) in Japan, the major source of gallium is bauxite which is the raw material for making aluminum. However, the efficiency for recovering gallium directly from bauxite is low, because of the low gallium content in bauxite, e.g., 50-100 p.p.m.

The process of recovering gallium from Bayer liquor is mentioned in process (i) above. Electrochemical reduction with a mercury cathode create an environmental pollution problem because of the mercury. The solvent extraction process also has problems such as deterioration of the expensive extracting agent, loss by decomposition and the suspension and contamination of the Bayer liquor with organics, because the Bayer liquor is highly caustic.

The complicated processes and expensive treating costs were required in process (i) because of the very low gallium content. Aluminum smelting dust having comparatively high gallium content is preferable as a raw material. Gallium contained in Bayer liquor exhibits the same behavior as aluminum, and almost all of the gallium goes into alumina. The gallium concentration in alumina depends on the quality of bauxite, and 20 p.p.m.-100 p.p.m. is usual. In aluminum smelting dust, gallium is concentrated as highly as 800 p.p.m.-3000 p.p.m. The general composition of dust evolved from an aluminum electrolysis process is 0.08-0.30 wt.% of gallium, 0.5-2.0 wt.% of iron, 10-20 wt.% of aluminum, 10-20 wt.% of sodium, 10-30 wt.% of flourine, 10-30 wt.% of carbon and less than 1 wt.% of silicon, nickel, titanium calcium, copper, magnesium, cobalt and vanadium. For recovering gallium from the dust, first of all, gallium is extracted from the dust into an aqueous solution, and secondly the solution is treated so as to separate gallium from the other metal impurities.

The above-mentioned British Pat. No. 1527981 relates to a process for producing gallium from aluminum smelting dust.

The process consists of roasting the dust at a high temperature, after adding alkaline flux, followed by leaching the roasted mixture of dust and flux with water, and then precipitating the dissolved gallium by adding base metal powder (aluminum or magnesium) into the leach liquor. However, the above-mentioned process has a practical limitation, for the process requires not only special facilities for roasting, but expensive alkaline flux as well as fuel and power for combustion.

The direct leaching of the unroasted dust with either mineral acid such as sulfuric acid, hydrochloric acid and nitric acid or alkali such as sodium hydroxide and potassium hydroxide is also unpractical, as gallium is hardly leached out.

SUMMARY OF THE INVENTION

It is an object of the present invention to provide a process for preferentially leaching gallium from aluminum smelting dust.

The object of the present invention is achieved by adding oxidizing agents such as potassium permanganate, manganese dioxide, hydrogen peroxide, ozone, potassium chromate, potassium dichromate, ammonium persulfate, sodium hypochlorite, sodium chlorite and sodium chlorate at the time of treating aluminum smelting dust with mineral acids.

DETAILED DESCRIPTION OF THE INVENTION

In the present invention, gallium is preferentially leached from aluminum smelting dust of which gallium is concentrated at 0.08-0.30 wt.%. The dust is leached with mineral acids. Either of sulfuric acid, hydrochloric acid and nitric acid is used for the mineral acids, and potassium permanganate, manganese dioxide, hydrogen peroxide, ozone, potassium chromate, potassium dichromate, ammonium persulfate, sodium hypochlorite, sodium chlorite and sodium chlorate are used as an oxidizing agent in the present invention.

The addition of an oxidizing agent to the leach solution is remarkably effective to improve the gallium extraction. In addition, it is advantageous that the oxidizing agent affects only the extraction of gallium, but does not affect the extraction of aluminum.

The production of gallium metal from gallium-containing solution can be done by a conventional method, an example of which follows:

The gallium containing solution is first neutralized with alkali, and gallium hydroxide is produced at pH 4-5. Secondly, the hydroxide is dissolved with hydrochloric acid.

The gallium chloride solution is purified by means of solvent extraction. Isopropylether is commonly used for this purpose. The ether extracts gallium selectively. The gallium loaded on the ether is stripped with water.

The purified gallium chloride solution is then hydrolyzed to precipitate gallium hydroxide. The hydroxide is dissolved in a caustic soda solution, and then the solution is electrolyzed to obtain high purity gallium metal.

(EXAMPLE 1)

One hundred and fifty (150) g of aluminum smelting dust which was collected in an electric precipitator attached to aluminum electrolysis cells was mixed with 500 ml of water to make a slurry. The composition of the dust was 22.2 wt.% of Al, 18.8 wt.% of F, 0.72 wt.% of Fe and 0.14 wt.% of Ga. Ninety (90) g of $H_2SO_4$ (purity, 98%) and 4 g of $KMnO_4$ (purity, 98%) were added to the slurry. The temperature of the slurry was kept at 95° C. for 2 hours while being stirred. The slurry was then filtered, and the filtrate thus obtained was analyzed. It was found that 78 wt.% of gallium in the dust was leached out. The composition of the filtrate is shown in Table 1.

TABLE 1

| pH | Ga | Al | Fe | F | (unit g/l) Mn |
|---|---|---|---|---|---|
| 0.8 | 0.31 | 28.0 | 1.67 | 32.6 | 2.7 |

(CONTROL EXPERIMENT 1)

The same procedure was performed with the same dust sample, but without the addition of $KMnO_4$. The extraction of gallium was 54%. Table 2 showed the analysis of the filtrate.

TABLE 2

| pH | Ga | Al | Fe | (unit g/l) F |
|---|---|---|---|---|
| 0.57 | 0.21 | 35.0 | 1.27 | 37.0 |

(EXAMPLE 2)

One hundred and fifty (150) g of aluminum smelting dust which was collected in an electric precipitator attatched to aluminum electrolysis cells was mixed with 500 ml of water to make a slurry. The composition of the dust was 19.8 wt.% of Al, 23.9 wt.% of F, 0.72 wt.% of Fe and 0.20 wt.% of Ga. Ninety (90) g of $H_2SO_4$ (purity, 98%) and 15 g of $MnO_2$ (purity, 90%) were added to the slurry. The temperature of the slurry was kept at 95° C. for 2 hours while being stirred. The slurry was then filtrated, and the filtrate thus obtained was analyzed. It was found that 60 wt.% of gallium in the dust was leached out. The composition of the filtrate is shown in Table 3.

TABLE 3

| pH | Ga | Al | Fe | F | (unit g/l) Mn |
|---|---|---|---|---|---|
| 0.56 | 0.36 | 21.0 | 1.93 | 24.0 | 6.8 |

(CONTROL EXPERIMENT 2)

The same procedure was performed with the same dust sample, but without addition of $MnO_2$. The extraction of gallium was 41%. Table 4 showed the analysis of the filtrate.

TABLE 4

| pH | Ga | Al | Fe | (unit g/l) F |
|---|---|---|---|---|
| 0.24 | 0.25 | 19.0 | 1.45 | 25.0 |

From these examples, it is evident that the present invention provides a process for obtaining gallium-contaning aqueous solution from aluminum smelting dust at a high yield, without adopting troublesome processes such as roasting of the dust.

What we claim are:

1. A process for producing a gallium-containing solution from aluminum smelting dust comprising leaching aluminum smelting dust with a mineral acid selected from the group consisting of sulfuric acid, hydrochloric acid and nitric acid, adding an oxidizing agent to the aluminum smelting dust at the time of leaching to preferentially leach and extract gallium from the aluminum smelting dust without extracting aluminum from the aluminum smelting dust, said oxidizing agent being selected from the group consisting of potassium permanganate, manganese dioxide, hydrogen peroxide, ozone, potassium chromate, potassium dichromate, ammonium persulfate, sodium hypochlorite, sodium chlorite and sodium chlorate, and filtering the leached aluminum smelting dust to obtain a gallium-containing solution of dissolved gallium.

2. A process for producing a gallium-containing solution from aluminum smelting dust according to claim 1 further comprising forming an aqueous slurry of aluminum smelting dust prior to leaching.

3. A process for producing a gallium-containing solution from aluminum smelting dust according to claim 1, wherein the aluminum smelting dust is not roasted prior to leaching.

4. A process for producing a gallium-containing solution from aluminum smelting dust according to claim 1, wherein the aluminum smelting dust contains from 0.08 to 0.30% by weight gallium.

5. A process for producing a gallium-containing solution from aluminum smelting dust according to claim 1, wherein the aluminum smelting dust contains, by weight, 0.08 to 0.30% gallium, 0.5 to 2.0% iron, 10 to 20% aluminum, 10 to 20% sodium, 10 to 30% fluorine, 10 to 30% carbon, and less than 1% silicon, nickel, titanium, calcium, copper, magnesium, cobalt and vanadium.

* * * * *